June 1, 1954
T. C. PRIDMORE ET AL
2,680,186
TEMPERATURE CONTROL
Filed June 11, 1949
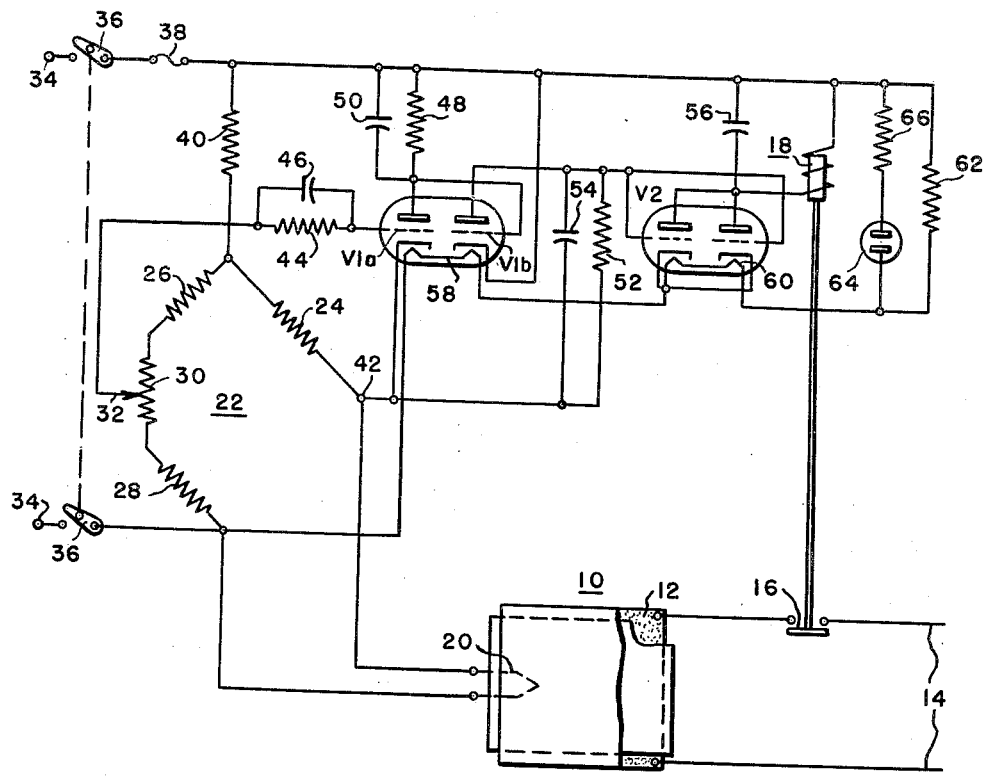
WITNESSES:
E. A. McCloskey
W. L. Groove
INVENTORS
Thomas C. Pridmore
and George W. Nagel.
BY
Hyman Diamond.
ATTORNEY Patented June 1, 1954

2,680,186

UNITED STATES PATENT OFFICE 2,680,186

TEMPERATURE CONTROL

Thomas C. Pridmore, McKeesport, and George W. Nagel, Pittsburgh, Pa., assignors to Westinghouse Electric Corporation, East Pittsburgh, Pa., a corporation of Pennsylvania Application June 11, 1949, Serial No. 98,548

10 Claims. (Cl. 219—20)

This invention pertains to automatic temperature regulation, and particularly to a system for controlling the supply of heating energy to a body whose temperature it is desired to maintain within rather close predetermined limits.

It is an object of the invention to provide a temperature regulating apparatus in which the supply of heating energy to a heating element in heat interchange relation with a body whose temperature is to be controlled, is governed in accordance with a sensing element also in heat interchange relation with said body.

It is a further object of the invention to provide an apparatus of this kind which is essentially "fail safe" in operation; that is, one in which the energy supply to the object being controlled will be interrupted by almost any type of failure in the controlling apparatus. The system disclosed herein provides for such interruption of the energy flow for either short circuit or open circuit of the sensing element, as well as for failure of line voltage and of the vacuum tube or tubes employed in the controlling circuit.

Still another object of the invention is to provide a control apparatus of the above type which, while relatively simple in construction, and entirely automatic in operation, nevertheless provides an extremely accurate control over the temperature maintained in the controlled body.

The manner in which the above objects of the invention are achieved by the present invention will best be understood by referring to the following detailed specification of a preferred and exemplary embodiment thereof, taken in connection with the appended drawing, the single figure of which is a schematic diagram of the complete control system.

The principles of our invention, as indicated above, may be applied to a large number of different types of applications, but for purposes of illustration a particular embodiment suitable for the temperature control of an aircraft window to prevent frosting thereof under the low temperature conditions of the ambient atmosphere, has been illustrated in the drawing and will be described in detail.

Referring now to the drawing, numeral 10 designates diagrammatically a window such as a window of an aircraft or other vehicle, the same being provided with a resistance-type electric heating element 12 which may conveniently be distributed about the area of said window (for example, by being laminated between two layers of plastic or glass which constitute the transparent pane of the window), which heating element is normally connected as at terminals 14 to a source of electric current for heating purposes, the circuit to said source including the normally opened contacts 16 of an electromagnetic relay 18 which is operated under the control of a temperature sensing element 20.

Sensing element 20 may desirably comprise a length of wire having a finite temperature coefficient of resistivity and arranged in heat conducting relation to the material comprising window 10. For the purpose of averaging out local variations in the temperature of said window, the sensing element 20 may desirably be distributed about the area of said window, it being understood that there is no electrically conductive connection between the heating element 12 and the sensing element 20.

In order to utilize the resistance of sensing element 20 to govern the application of heater power from a source 14 through contact 16 to heating element 12, we provide a Wheatstone bridge arrangement which is a balanced network designated generally by numeral 22, one leg of which is constituted by sensing element 20 and the electrically conducting leads therefor. The remaining legs of the bridge are formed by resistors 24, 26 and 28, the last two of which are joined together by a series resistor 30 provided with a movable tap 32 which may be adjusted to balance out circuit variations and to set the controlled temperature of window 10 to a desired value.

Terminals 34 are provided for connecting the Wheatstone bridge 22 and the electronic components of the control circuit to a suitable source of power which may for example be a 115 volt alternating current circuit available in the aircraft or other vehicle. A switch 36 is provided in this power supply line to put the control circuit into and out of operation, and the power supply circuit may be fused as at 38 in a well known manner. A portion of this supply voltage is supplied across one diagonal of bridge 22 through a dropping resistor 40, and in accordance with well known principles, the degree of unbalance (if any) of said bridge will be reflected as a potential across the opposite diagonal of the bridge; in the present case as a potential between contact 32 and connection 42 which is common to resistor 24 and the leg comprising the sensing element 20.

In order to amplify variations in the output potential of bridge 22 the conductor from contact 32 is connected to the control grid of a triode unit V1a (which triode unit may be one element of a dual triode tube such as an RMA type 12AX7), this control grid being negatively biased by resistor-condenser combination 44, 46 in a well known manner. The anode or plate electrode of the triode unit V1A is connected to one side of the supply line through a resistor-condenser combination 48, 50 providing control voltage to the grid of a second triode unit V1b which may be in the same envelope as V1a. Variations in the space current of triode V1a therefore control the space current in triode V1b, whose plate electrode is returned through resistor-condenser combination 52, 54 to the connection 42. The plate of triode V1b is also connected directly to both the control grids of a triode unit V2 (which may be type 12AU7) having its corresponding electrodes connected in parallel for increased power-handling capacity.

The total space current of vacuum tube V2 passes through the winding of relay 18, and across which winding may be connected a condenser 56 which will operate to smooth out variations in the potential applied to the relay coil and to eliminate chattering of its contacts. The cathode elements of tube V2 are returned to the lower side of the supply line through at least one of the heater elements 58, 60 of the respective tubes, said heaters being in series relationship with one another and with an appropriate dropping resistor 62 leading to the opposite side of the power supply. An indicator lamp 64, which may be a small neon lamp, is connected across resistance 62 in series with a dropping resistor 66, and serves to indicate that current is flowing through the heater elements 58 and 60, and hence that the apparatus is in energized condition.

In operation the values of the resistance comprising the bridge are preferably so chosen that there is no output voltage from the bridge (the bridge is balanced) when the temperature of the window is slightly below desired operating temperatures. When the bridge is unbalanced by a further decrease in temperature, the terminal 32 becomes positive with respect to the terminal 42, during the half periods of the supply when the anode cathode potential of V1a is positive.

Under such circumstances the relay 18 is actuated and current flows through the heater. The window is heated until it reaches operating temperature at which point the bridge is slightly unbalanced in the opposite sense so that the terminal 32 becomes negative with respect to the terminal 42. At this point the control system is balanced and supplies no heating current.

Assume now that when the system is first energized the window temperature is below the point at which the bridge is balanced. The resistor-condenser combination 48, 50 provides a large negative signal to the grid of triode V1b, resulting in low space current in that unit. The resistor-condenser combination 52, 54 therefore furnishes low bias to the parallel-connected control grids of vacuum tube V2 through which a large amount of plate current consequently flows to the winding of relay coil 18, causing the relay contacts 16 to close and applying heating current from source 14 to the heating element 12.

The application of heating current to element 12 produces a temperature rise in the material constituting window 10, until the temperature thereof reaches the desired predetermined value. At this point, the resistance of sensing element 20 will have increased to magnitude above the point of bridge balance, providing a large negative bias between the grid and cathode of triode unit V1a, and therefore reducing the space current in that tube to a very small value. The resistor-condenser combination 48, 50 therefore furnishes low negative bias to the grid of unit V1b, and the space current therethrough provides a large negative bias voltage to the grids of vacuum tube V2. The reduction of plate current in the latter tube therefore deenergizes coil of relay 18, allowing contact members 16 to open, discontinuing the application of heat to window 10.

The above operation is repeated so long as the control apparatus is energized, and operates to maintain the temperature of window 10 within about 0.4° F. on either side of the desired window temperature.

It is clear from the above description that as the temperature of the sensing element 20 is increased, its resistance is also increased resulting in a power-off condition of the heater 12. Also, if for any reason the sensing element 20 should develop an open circuit condition, corresponding to an infinite resistance thereof, the relay contacts will open and heater 12 will receive no power.

In order to make the apparatus "fail safe" also for a short circuit condition in sensing element 20, the cathodes of tube V2 are returned to a point above the lower side of the supply line from terminals 34 (for example, by connecting said return line to a point separated from the supply line by the resistance of one of the heaters 58 and 60). This arrangement provides sufficient negative bias on the grids of tube V2 to reduce the space current therein nearly to zero when the grids of tube V2 are brought to the potential of the lower side of the supply line. Since this condition will occur when the sensing element 20 is short circuited, the relay 18 will open and interrupt the current flow to heater 12 when such a short circuit condition in element 20 occurs.

In the event of failure of power supply at terminals 34, there can be no space current through tube V2 whose space current path is connected across said terminals. Under this condition also, then, relay 18 cannot close and no current will flow in the heater 12.

It will be noted from the drawing that the heaters of elements V1a, V1b and V2 are all connected in series, hence, if any of the tube filaments should become open circuited, all of the cathodes will cool down and no plate current will flow through tube V2 or through the coil of relay 18. Under this condition, therefore, relay contact members 16 will remain open and no current will flow in heater 12.

The following circuit constants applicable to the arrangements shown in the drawing are furnished by way of illustration, and without limiting the invention to these specific values:

*Resistors*

| | | |
|---|---|---|
| 24 | ohms | 300 |
| 26, 28 | do | 330 |
| 30 | do | 50 |
| 40 | do | 1500 |
| 44, 48, 52 | megohm | 1 |
| 62 | ohms | 700 |
| 66 | megohm | 1 |

*Capacitors*

| | | |
|---|---|---|
| 46, 50, 54 | mfd | .01 |
| 56 | do | .5 |

It will be seen from the above description that we have provided a temperature control apparatus which, while quite simple and capable of extremely accurate control, also provides for discontinuance of the application of heating energy upon any kind of failure within the sensing element or the controlling apparatus itself, as well as upon failure of the power supply to said apparatus. While the invention has been described herein as applied to a particular application of window temperature control to which it is well adapted, utilizing electrical power for heating, it will be apparent to those skilled in the art that the same system of control may equally well be applied to other applications, for example to installations in which the heating energy is not electrical but may be controlled by relay 18 as by an electrically operated valve or the like. Also, the particular control circuit disclosed may be varied as to details without departing from the spirit of our invention as defined in the appended claims.

We claim as our invention:

1. In a system for controlling the supply of current to a heater from heating potential supply terminals in response to a temperature-sensing element which has a positive resistance-temperature coefficient, terminals for supplying an alternating potential to said system; means for producing a control potential when said sensing element departs from a predetermined temperature; a plurality of amplifiers connected in cascade each having an anode, a cathode and a control electrode, the anode of the first of said amplifiers being connected to one of said alternating potential terminals and the cathode being adapted to be connected to another of said alternating-potential terminals through said sensing element and the anode of the last of said amplifiers being connected to said one alternating-potential terminal and the cathode to said other alternating-potential terminal through voltage dropping means; means connected to said temperature-potential producing means for impressing said temperature-produced potential between the control electrode and the cathode of said first amplifier in such a sense that when said sensing element is below said temperature said control electrode is rendered more positive relative to said cathode than it is with said sensing element at a higher temperature; and means responsive to said last amplifier for controlling the connection between said heating potential supply terminals and said heater, said last amplifier becoming non-conducting when the sensing element is either short circuited or open circuited.

2. In combination, an electric heater; a heating power supply circuit therefor; relay means for controlling the application of power to said heater from said supply circuit, said relay means being actuable to increase the temperature of said heater; a temperature-sensing element having a pair of terminals in thermally conductive relation to said heater; a balanced network including said element as one leg thereof and having input and output terminals, one of said input terminals being connected to one terminal of said sensing element and one of said output terminals to the other terminal of said element; a control power supply connected between said input terminals; a multi-stage amplifier comprising cascade-connected vacuum tube stages each including an anode, a control grid and a cathode; means for connecting said control power supply to supply potential to said amplifier; means connecting said output terminals between the control grid and cathode of one of said stages; connections between another of the stages of said amplifier and said relay means such that said relay means is actuable in response to current flow in said other stage to connect said heating supply circuit to said heater to increase the temperature of said heater; a connection including blocking bias resistance from the cathode of said other of said stages to said one input terminal; and a connection between the control grid of said last-named stage and the other terminal of said sensing element, said last-named connection providing a return connection to said last-named cathode through said blocking bias resistance such that said blocking bias resistance is effective if said terminals of said element are short circuited.

3. In combination, an electric discharge device having an anode, a cathode and a control electrode; a first terminal for connection to a potential supply source connected to said anode; a second terminal for connection to a potential supply source; means including biasing means for connecting said cathode to said second terminal, said biasing means being adapted to maintain said cathode at a potential intermediate those of said first and second terminals; third and fourth terminals adapted to have connected between them an impedance which varies in response to changes in ambient temperature, said fourth terminal being connected to said second terminal; means connecting said third terminal to said control electrode; and means, responsive to a decrease in the impedance of said impedance of a magnitude which would occur over the range of ambient temperature to which said impedance is to respond for impressing a potential on said control electrode to render said discharge device conductive; the combination being characterized by the fact that the means connecting said third terminal to said control electrode provides a return connection to said cathode including said biasing means and that the bias impressed by said biasing means is sufficient to maintain said device non-conducting when said impedance is short circuited.

4. In combination, a first electric discharge device having an anode, a cathode and a control electrode; a second electric discharge device having an anode, a cathode and a control electrode, said cathode including a heating filament; a first terminal for connection to a supply source connected to the anode of said first device, a second terminal for connection to a supply source; means connecting said cathode of said first device, said heater filament and said second terminal in series; third and fourth terminals adapted to have connected therebetween a resistor, the resistance of which varies with ambient temperature decreasing as the ambient temperature decreases; means connecting said third terminal to said control electrode of said first device thus providing a return connection to said cathode of said first device through said filament and through said resistor; means connecting said fourth terminal to said second terminal; means coupling the anode and cathode of said second device between the control electrode and cathode of said first device; and means interposed between the control electrode and cathode of said second device, connected to said resistor and responsive to a decrease in temperature within the range of said ambient temperature variation for rendering said first device conductive.

5. Apparatus according to claim 4, characterized by the fact that the first device also has a heater filament and that the heater filaments of the first and second devices are connected in series between said first terminal and said second terminal.

6. In combination, a first electric discharge device having an anode, a cathode and a control electrode; a second electric discharge device having an anode, a cathode and a control electrode, said last-named cathode including a heater filament; a first terminal for connection to a supply source connected to the anode of said first device; a second terminal for connection to a supply source; means connecting said cathode of said first device, said heater filament and said second terminal in series; third and fourth terminals adapted to have connected therebetween a resistor, the resistance of which varies with ambient temperature decreasing as the ambient temperature decreases; means connecting said third terminal to said control electrode of said first device thus providing a return connection through said filament and through said resistor to said cathode of said first device; means connecting said fourth terminal to said second terminal; means connecting the anode of said second device to said first terminal; means connecting the cathode of said second device to said third terminal; means coupling the anode and cathode of said second device between the control electrode and cathode of said first device so that said first device is conductive if said second device is conductive; and means interposed between the control electrode and cathode of said second device connected to said resistor and responsive to a decrease in temperature within the range of said ambient temperature variation for rendering said first device conductive.

7. Apparatus for controlling the heat supplied to a region by an electric heater supplied with current from heating potential supply conductors comprising a first conductor for supplying an alternating potential; a second conductor for supplying alternating potential; a temperature sensing element disposed in said region and having first and second terminals; means for supplying power to increase the temperature of said region including a first electric discharge device having an anode, a cathode and a control electrode and connections to said anode and cathode for connecting said supply conductors to said heater to increase the temperature of said region when the conductivity of said device increases; first connections between the control electrode and cathode of said first device including blocking bias means and said sensing element such that when said sensing element becomes short circuited said blocking bias means becomes effective; a second electric discharge device having an anode, a cathode and a control electrode; means for connecting in series said first and second alternating potential supply conductors, said first and second terminals, said anode and said cathode of said second device; means responsive to said element for producing a potential depending in magnitude and polarity on the temperature of said region; means connecting said responsive means to said control electrode of said second device for impressing said produced potential to increase the conductivity of said device when the temperature of said region decreases and to decrease the conductivity of said device when the temperature of said region increases; and second connections between said anode and cathode of said second device and said control electrode and cathode of said first device such that conductivity of said second first device is increased when the conductivity of said first device increases.

8. In combination a first conductor for supplying a potential; a second conductor for supplying a potential; a balanced network having a plurality of arms with impedances in each of said arms, a first input terminal, a second input terminal, a first output terminal and a second output terminal, the impedance of the one of said arms between said second input terminal and said second output terminal being a condition sensing element and, when said first input terminal is more positive than said second input terminal, said first output terminal becomes algebraically more positive than said second output terminal as the impedance of said element decreases and becomes algebraically more negative as the impedance of said element increases; means for connecting said first input terminals to said first conductor; means for connecting said second input terminal to said second conductor; a first electric discharge device having an anode, a cathode and a grid; means for connecting said anode to said first conductor; means for connecting said cathode to said second output terminal; means for connecting said grid to said first output terminal; a second electric discharge device having an anode, a cathode and a grid; means for connecting said last-named anode to said first conductor; means including blocking bias means for connecting said last-named cathode to said second conductor; means for connecting said last-named grid to said second output terminal; said last-named means providing a return connection to said last-named cathode through said blocking bias when said element is short circuited; and means for coupling said first discharge device to said second discharge device so that said second device is conductive when said first device is conductive.

9. In combination a condition sensing element having a first terminal and a second terminal; a first supply conductor; a second supply conductor; means for connecting said second terminal to said second conductor; a first amplifier stage having an anode, a cathode and a control electrode; means for connecting said anode and cathode in circuit with said first and second supply conductors; means for coupling said sensing element between said control electrode and cathode of said first stage so that the conductivity of said first stage is dependent on the condition of said sensing element; a second amplifier stage having an anode, a cathode and a control electrode; means for connecting said last-named anode to said first conductor; means including blocking bias means for connecting said last-named cathode to said second conductor; means for connecting said last-named control electrode to said first terminal; said means providing a return connection to said last-named control electrode through said blocking bias means when said element is short circuited; and means for coupling said anode and cathode of said first stage to said control electrode and cathode of said second stage so that the conductivity of said second stage is controlled by said first stage; said second stage becoming non-conducting on open circuit and short circuit of said sensing element.

10. Condition control apparatus including a condition sensing element and a cascade amplifier having an input stage to the input circuit of which said sensing element is connected, said sensing element being part of the input circuit and also completing the anode circuit of said stage; said amplifier also having other stages coupled to the output circuit of said input stage to amplify the output thereof, said cascade amplifier being connected to first and second power supply conductors; said apparatus being characterized by the fact that the cathode of one of said other stages is connected to said second power supply conductor through blocking bias means and through said sensing element, the grid of said last-named other stage is connected to said second conductor through said sensing element providing a return connection to the cathode of said last-named stage through said blocking bias when said sensing element is short circuited; and said anode of said last-named other stage is connected to said first conductor.

References Cited in the file of this patent

UNITED STATES PATENTS

| Number | Name | Date |
|---|---|---|
| 2,056,769 | Buchting | Oct. 6, 1936 |
| 2,189,462 | Donle et al. | Feb. 6, 1940 |
| 2,275,368 | Krause | Mar. 3, 1942 |
| 2,375,456 | Wolfner | May 8, 1945 |
| 2,446,390 | Rath | Aug. 3, 1948 |
| 2,446,810 | Cook | Aug. 10, 1948 |
| 2,456,916 | Chalberg | Dec. 21, 1948 |
| 2,462,207 | Mershon | Feb. 22, 1949 |
| 2,468,791 | Thomson | May 3, 1949 |
| 2,488,580 | Burleigh | Nov. 22, 1949 |
| 2,490,965 | Huck | Dec. 13, 1949 |
| 2,522,753 | Drobisch | Sept. 19, 1950 |
| 2,522,826 | Hooven | Sept. 19, 1950 |
| 2,529,796 | Cade | Nov. 14, 1950 |
| 2,534,323 | Thomson | Dec. 19, 1950 |